Nov. 12, 1957　　　M. A. CHAVANNES　　　2,812,550

METHOD FOR MAKING STRETCHED THERMOPLASTIC FILM

Filed Aug. 17, 1953

INVENTOR.
MARC A. CHAVANNES.

BY

Percy Freeman

ATTORNEY.

United States Patent Office 2,812,550
Patented Nov. 12, 1957

2,812,550
METHOD FOR MAKING STRETCHED THERMOPLASTIC FILM

Marc Alfred Chavannes, New York, N. Y.

Application August 17, 1953, Serial No. 374,688

6 Claims. (Cl. 18—48)

The present invention relates to apparatus and a method for reducing the thickness of plastic films and the like.

Heretofore, as is well known to those versed in the art, considerable difficulty has been encountered in attempts to calender relatively thin thermo plastic film, such as that of three mil thickness or less. Further, the manufacture of relatively thin thermo plastic films is expensive by casting methods, as such methods require the use of solutions, emulsions or dispersions, with the necessary evaporation of the solvents or dispersants. While the solvents or dispersants may be recovered after evaporation, the recovery operation itself is costly, and difficult or not economical with certain types of solvents.

Accordingly, it is a principal object of the present invention to provide a simple and efficient method for producing relatively thin thermo plastic films. An allied object resides in the provision of a novel method and apparatus for manufacturing relatively thin thermo plastic films without the use of solutions, emulsions, or dispersions, and in which there are no material losses incurred by evaporation or like operations.

It is another object of the present invention to provide a highly improved method by which relatively thin, thermo plastic films may be produced quickly and easily from calendered films made of polyvinyl chloride or of copolymers of vinyl chloride and vinyl acetate, or vinylidene chloride films, and at a cost just slightly more than that of the calendering operation alone. It is a coordinate object of the present invention to provide means for reducing the thickness of a thermo plastic film which may be performed in line with high speed calendering, or as a separate operation, as desired.

Other objects of the present invention will become apparent upon reading the following specification and referring to the accompanying drawings, which form a material part of the disclosure.

The invention accordingly consists in the features of construction, and combinations and arrangements of parts and method steps, which will be exemplified in the construction and operation hereinafter described, and of which the scope will be indicated by the appended claims.

Figure 1:
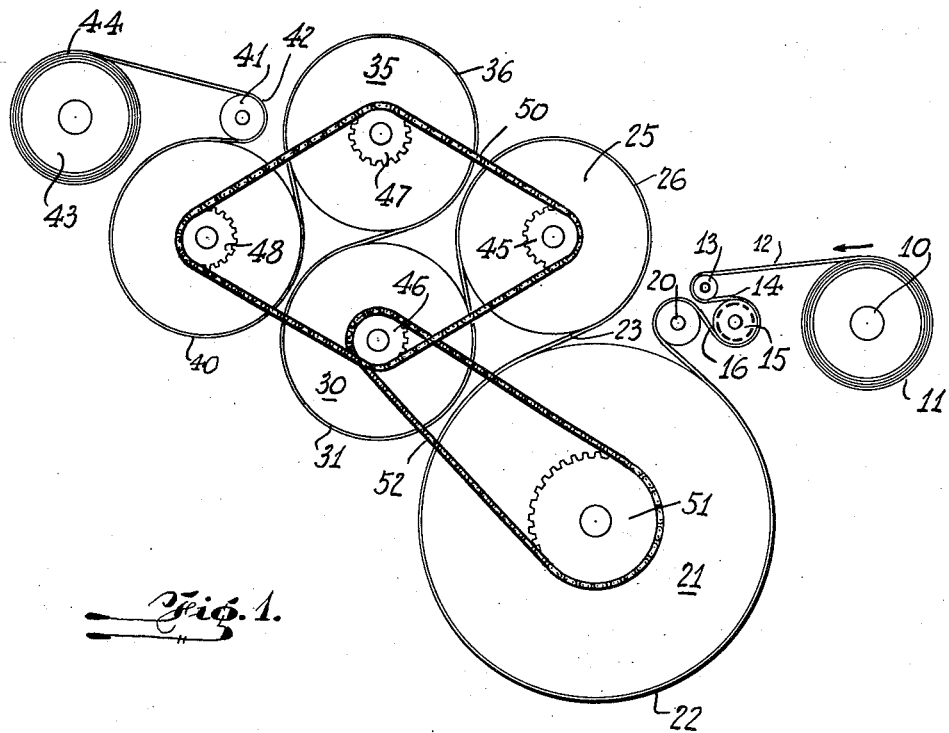
Fig. 1 is a somewhat diagrammatic, side elevational view illustrating apparatus constructed in accordance with the present invention.

Referring now more particularly to the drawings, the embodiment of the invention illustrated therein comprises a feed or unwind roll 10 adapted to rotatably support a coil 11 of thermoplastic film or sheeting, which is to be reduced in thickness. As will soon become apparent, any flexible, thermoplastic film may be operated upon so as to have its thickness reduced by the method and apparatus of the present invention. For example, an 8 mil polyvinyl chloride film can be industrially reduced to any desired thickness down to 1 mil or even less. While the film is illustrated as a coil 11, which has previously been calendered, it will be understood that the film may be fed directly from the calender itself, thereby eliminating the feed roll 10 and effecting a continuous, in line calendering and reduction of thickness operation. It can also come directly from the stripping and of a casting machine.

It is another object of the present invention to provide a method and apparatus by which a film as thin as 0.00075 or 0.00066 or even 0.0005 can be produced from a cast film of a thickness of 2 mil or more. A film of 2 mil can be industrially cast from organosols or plastisols, but those expert in the art know how extremely difficult it is to make finer uniform films from organosols or plastisols because of the difficulty of truly doctoring such dispersions of high solid content. It is for that reason that for films under 2 mil, solutions are used with low solid content which enables the doctoring of a thicker mass of liquid.

As the coil 11 unwinds, i. e. rotates in a counterclockwise direction, the film moves rearwardly as at 12 over the guide roll 13 and forwardly as at 14 under said guide roll. The film then passes around the expander roll 15, and leaves the latter traveling rearwardly and upwardly as at 16.

The film then passes over the backroll 20 and almost completely around the heating roll or drum 21 as at 22. The back roll 20 is preferably covered with rubber. Further, the use of a rubber backroll 20 pemits the contiguous positioning of the back roll and the heating roll 21 so as to press or forcibly apply the film to the surface of the heating roll. Such an arrangement has been found to effect complete surface contact of the film with the heating roll 21 and thereby provide uniform heating of the film as it travels around the heating roll. The contiguous relation of the back roll 20 and heating roll 21 prevents the formation of air pockets between the film and heating roll, which would result in irregular heating and wrinkling of the film.

The heating roll or drum 21 may be of any suitable construction, such as will transmit heat uniformly to the film passing over the drum.

In practice it is necessary that the heating drum 21 bring the film to a level of temperature at which orientation of part of the molecular chains takes place without any drawing, meaning without stretching the film irregularly but, on the contrary, keeping the relative thickness of all its parts as uniform as it is in the film before the stretching operation. For the polyvinyl chloride films and those of substantially similar characteristics made out of copolymers of vinyl chloride and either vinyl acetate or vinylidene chloride a temperature of from 170° F. to 225° F. has been found preferable, depending upon the molecular weight of the resin used in the film.

It is preferred that the film temperature at the point 23 be maintained substantially constant, and at a value between 170° F. and 225° F., depending upon the molecular weight of the resin used to make the film.

The film then advances over and almost completely around a second heating roll or cylinder 25, as at 26. The heating cylinder 25 is at a temperature equal to that of the heating cylinder 21, so that the stretching of the film is made at a constant level of temperature between two heating cylinders of substantially the same temperature. As will be pointed out more fully hereinafter, the heating cylinder 25 rotates so that its surface speed is greater than that of the heating cylinder 21, whereby the film is stretched or expanded as it advances from the cylinder 21 to the cylinder 25. This stretching or expansion will effect a reduction in thickness of the film, in an amount dependent upon the percentage of stretch or expansion. The heretofore described elevated temperature, at which the film is stretched, has been found to be optimum for permitting the orientation of part of the molecular chains of the resin of the film.

From the stretching cylinder or roll 25, the film passes over and almost completely around a first annealing roll or cylinder 30, as at 31. The annealing roll 30 is heated so as to raise the temperature of the film 31 from between 25° F. to 75° F. above the film temperature at the heating rolls 21 and 25. Thus, while the film is passing over the roll 30, the film temperature is raised to a temperature sufficient to only partially anneal the stresses of the film. That is to say only a fraction of those of the molecular chains which were oriented by the stretching, as described above, will be released to return to their original positions at that first annealing step.

Where only two annealing steps are used as illustrated in Fig. 1, it has been found preferable in this first annealing step to employ film temperatures of from 45° F. to 65° F. over the stretching temperature for maximum annealing effect.

As illustrated, a second annealing roll or cylinder 35 is then employed to complete the annealing of the stresses imposed by the stretching of the film, as at 36. The annealing temperature of the film portion 36 for the second annealing step, is preferably from 45° F. to 65° F. above the annealing temperature of the film portion 31 during its first annealing step. This has been found to allow the remaining oriented molecules to free themselves to return to the original positions they occupied before the stretching, thus relieving substantially all of the stresses imposed by the stretching operation.

From the annealing roll 35, the film progresses around the cooling roll 40, where the film temperature is reduced to that of the ambient atmosphere. The film then passes over a guide roll 41 as at 42 and is coiled about a take-up roll 43, as at 44.

As will be noted in Fig. 1 of the drawings, the heating roll 25, annealing rolls 30 and 35, and cooling roll 40 are all of substantially the same diameter and provided, respectively, with sprocket wheels 45, 46, 47 and 48, which are of diameters equal to each other. A sprocket chain 50 is in meshing engagement with all of the sprocket wheels 45, 46, 47 and 48 so that any suitable drive means may be operatively connected to any one of the rolls 25, 30, 35 or 40 for effecting rotative movement of all of said rolls. Further, said rolls will all have substantially identical surface speeds. However, the heating roll 21 and its sprocket wheel 51 are so proportioned that the sprocket chain 52 interconnecting the sprocket wheel 46 and the sprocket wheel 51 will effect rotation of the heating roll 21 such that its surface sped is less than that of the heating roll 25, as described hereinbefore. The use of non-adhesive agents such as silicones, fluor synthetic resins like $C_2F_4$ or $C_2F_3Cl$, to prevent sticking of the film to the rolls, is indicated on the annealing rolls 30 and 35. Further, it is appreciated that any of the rolls, both heating and cooling, may be increased in number without deviating from the present invention.

If good practical results have been accomplished by two annealing steps as described in Fig. 1, better results are attained when a greater number of steps are used with smaller differences of temperature between them like 25° F. or less. It is as if the annealing effect of the first heating step had freed enough molecular chains of the orientation imposed on them by the stretching so as to "make room" for the movements of the molecular chains yet under stress which during the succeeding annealing steps, will recover their relative positions occupied by them before the stretching. By heating the film immediately after stretching to the highest level of annealing temperature, one does not get a uniform and regular product; it is as if some of the oriented chains could not disentangle themselves and remain "in the way" of the other chains, not allowing them to recover their preferred positions.

Figure 2:
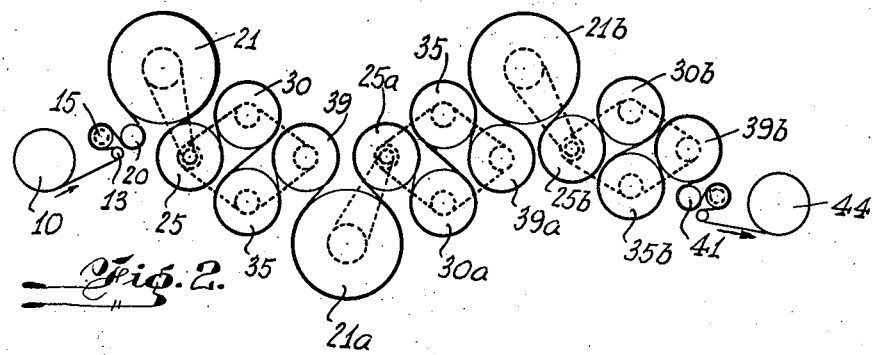
Fig. 2 is a diagrammatic, side elevational view illustrating a tandem operation of the device of Fig. 1.

A succession of stretching and annealing operations can be also recommended, imposing smaller percentages of stretch with lesser stresses to anneal each time. If preferred to effect a series of such operations, each will stretch the film and reduce the thickness thereof an increment of the total desired reduction in thickness. Thus, as illustrated in Fig. 2, a first set of heating, stretching, annealing and cooling rolls is designated by numerals corresponding to those of Fig. 1, while a second and third set of substantially identical rolls are designated by corresponding numerals having the subscripto "$a$" and "$b$." That is, a series of three sets of rolls is provided, wherein the sets are arranged in tandem with each other so that a sheet or film may be operated upon successively by each of said sets of rolls.

It will now be understood that the reduction in thickness may be effected as a continuous operation directly in line with the calender, without reducing the speed of operation of the calender.

If stresses have been imposed by the calendering itself, it is preferable to use a series of annealing rolls to anneal the film to relieve those stresses at temperatures similar to those indicated for cylinders 25, 30 and 35. After this first annealing operation, the film is cooled like on cylinder 39 (Fig. 2), then fed to the stretching operation in the best possible conditions to be stretched uniformly and regularly.

It should be noted that in order to avoid any substantial diminution of the width of the film while being reduced in thickness by the stretching operation, it is necessary to transfer the film from one of the stretching drums to the other in as short a span as possible consistent with the unimpeded travel of the film.

It will be understood that no results can be achieved if the film has lost its integrity by being heated too close to its melting point or charring point. Hence, while the final annealing step, in each case, must be at a higher temperature than that at which the film was calendered, it must be below that at which the film loses its integrity as a film or ceases to be self-sustaining.

From the foregoing, it is seen that the present invention fully accomplishes its intended objects, and is well adapted to meet practical conditions of use.

Although the present invention has been described in some detail by way of illustration and example for purposes of clarity of understanding, it is understood that certain changes and modifications may be made within the spirit of the invention and the scope of the appended claims.

Having thus described my invention, what I claim as new and desire to secure by Letters Patent, is:

1. The method of reducing the thickness of calendered thermoplastic films made of any of the materials of the group consisting of polyvinyl chloride or copolymers of vinyl chloride and vinyl acetate, and copolymer of vinyl chloride and vinylidene chloride which method comprises the steps of annealing the film in three successive stages of temperature to relieve the film of substantially all internal stresses imposed by the calender, the first said stage being at a temperature of about 200° F., the second stage at a temperature of about 265° F., the third at a temperature of about 330° F., then cooling the film to about 200° F. then stretching the film, while maintaining said latter temperature uniform, and then relieving the film of the stresses imposed by the stretching by heating the film in three successive stages, the first at a temperature of about 250° F. the second at a temperature of about 300° F. the third at a temperature of about 330° F. and then cooling the film to room temperature.

2. The method of reducing the thickness of calendered thermoplastic films made of any of the materials of the group consisting of polyvinyl chloride or copolymers of vinyl chloride and vinyl acetate, and copolymer of vinyl chloride and vinylidene chloride, which method comprises the steps of annealing the film in three successive stages of temperature to relieve the film of substantially all internal stresses imposed by the calender, the first said stage being at a temperature of about 200° F., the second stage at a temperature of about 265° F., the third at a temperature of about 330° F., then cooling the film to about 200° F., then stretching the film while maintaining said latter temperature uniform, and then relieving the film of the stresses imposed by the stretching, by heating the film in five successive stages, the first said stage being at a temperature of about 225° F., the second said stage being at a temperature of about 255° F., the third said stage being at a temperature of about 280° F., the fourth said stage being at a temperature of about 310° F., the fifth said stage being at a temperature of about 330° F., and then cooling the film to room temperature.

3. The method of reducing the thickness of calendered thermoplastic film made of any of the materials of the group consisting of polyvinyl chloride or copolymers of vinyl chloride and vinyl acetate, and copolymer of vinyl chloride and vinylidene chloride which method comprises the steps of annealing the film in a plurality of successive stages, each stage being at a higher temperature than the preceding stage, to relieve the film of internal stresses, cooling the film to about 200° F., stretching the film while maintaining the temperature constant and uniform throughout the stretching step, repeating the annealing steps, again reducing the film temperature to about 200° F., repeating the stretching step and then cooling the film to room temperature.

4. The method of reducing the thickness of calendered thermoplastic film which comprises subjecting the film sequentially to a plurality of annealing steps, at successively higher temperatures the highest being above that at which the film was calendered but below that at which the film would lose its integrity; to a stretching step; to a plurality of annealing steps and finally to a cooling step to reduce the temperature of the film to about room temperature.

5. The method of reducing the thickness of calendered thermoplastic film which comprises subjecting the film sequentially to a plurality of annealing steps, to substantially free the film of the internal stresses imposed by the calendering operation, then to a stretching step at a temperature which is high enough to permit at least partial orientation of the molecules but below that at which the film would begin to draw, then to a plurality of annealing steps, to relieve the film of the internal stresses imposed by the stretching step, and finally to a cooling step to bring the film to room temperature.

6. The method of reducing the thickness of calendered thermoplastic film, which comprises subjecting the film sequentially to a plurality of annealing steps, to substantially free the film of the internal stresses imposed by the calendering operation, each at a successively higher temperature, the highest being at between 5% to 10% higher than the temperature at which the film was calendered, then to a stretching step at a temperature which is high enough to permit at least partial orientation of the molecules but below that at which the film would begin to draw, then to a plurality of annealing steps, each at a successively higher temperature, the highest being between 5% and 10% above that at which the film was calendered to relieve the film of the internal stresses imposed by the stretching step, and finally to a cooling step to bring the film to room temperature.

References Cited in the file of this patent

UNITED STATES PATENTS

| | | |
|---|---|---|
| 2,177,661 | Kimble | Oct. 31, 1939 |
| 2,239,780 | Fikentscher et al. | Apr. 29, 1941 |
| 2,320,115 | Young | May 25, 1943 |
| 2,451,597 | Wheeler | Oct. 19, 1948 |
| 2,540,986 | Klein et al. | Feb. 6, 1951 |
| 2,547,763 | Land et al. | Apr. 3, 1951 |
| 2,560,038 | Trainer | July 10, 1951 |
| 2,578,899 | Pace | Dec. 18, 1951 |
| 2,679,088 | Meherg et al. | May 25, 1954 |